(12) United States Patent
Bing et al.

(10) Patent No.: US 8,254,449 B2
(45) Date of Patent: Aug. 28, 2012

(54) VIDEO TRAFFIC BANDWIDTH PREDICTION

(75) Inventors: Benny Bing, Atlanta, GA (US); Laetitia Lanfranchi, Paris (FR)

(73) Assignee: Georgia Tech Research Corporation, Atlanta, GA (US)

( * ) Notice: Subject to any disclaimer, the term of this patent is extended or adjusted under 35 U.S.C. 154(b) by 398 days.

(21) Appl. No.: 12/550,698

(22) Filed: Aug. 31, 2009

(65) Prior Publication Data
US 2010/0054333 A1    Mar. 4, 2010

Related U.S. Application Data

(60) Provisional application No. 61/092,823, filed on Aug. 29, 2008.

(51) Int. Cl.
*H04N 7/12* (2006.01)
(52) U.S. Cl. .................. 375/240.12; 386/329
(58) Field of Classification Search .......... 370/240–241
See application file for complete search history.

(56) References Cited

U.S. PATENT DOCUMENTS

| | | | |
|---|---|---|---|
| 5,537,446 A | 7/1996 | Lakshman et al. | |
| 6,192,032 B1 | 2/2001 | Izquierdo | |
| 6,803,964 B1 | 10/2004 | Post et al. | |
| 7,333,515 B1 * | 2/2008 | Ramakrishnan et al. | ..... 370/487 |
| 2007/0036227 A1 | 2/2007 | Ishtiaq et al. | |
| 2007/0206639 A1 * | 9/2007 | Zhao et al. | ..................... 370/477 |
| 2008/0137735 A1 | 6/2008 | Kamariotis et al. | |
| 2008/0263616 A1 * | 10/2008 | Sallinen et al. | ................ 725/131 |
| 2008/0298467 A1 * | 12/2008 | Sallinen et al. | .......... 375/240.25 |
| 2009/0041114 A1 | 2/2009 | Clark | |
| 2009/0097555 A1 * | 4/2009 | Baillavoine et al. | ..... 375/240.12 |
| 2010/0027663 A1 | 2/2010 | Dai et al. | |
| 2011/0032428 A1 | 2/2011 | Bing | |
| 2011/0032429 A1 | 2/2011 | Bing | |

FOREIGN PATENT DOCUMENTS

GB    2447431 A  *  9/2008

OTHER PUBLICATIONS

J Rexford, et al., "Online Smoothing of Live, Variable-Bit-Rate Video," Proceedings of the Workshop on Network and Operating System Support for Digital Audio and Video, pp. 249-257, May 1997.
J. Salehi, et al., "Supporting Stored Video: Reducing Rate Variability and End-to-End Resource Requirements through Optimal Smoothing,"IEEE Transactions on Networking, vol. 6, No. 4, Aug. 1998, pp. 397-410.

(Continued)

*Primary Examiner* — Ayaz Sheikh
*Assistant Examiner* — Mounir Moutaouakil
(74) *Attorney, Agent, or Firm* — Merchant & Gould (57) ABSTRACT

Video traffic bandwidth prediction may be provided. Frames of a video stream may be encoded according to a compression scheme. The encoded frames may be received and, depending on the type of frame, may be used to predict the size of other frames of the stream. The predicted frame sizes may then be used to allocate bandwidth for transmission of the video stream.

18 Claims, 6 Drawing Sheets

OTHER PUBLICATIONS

O. Hadar and S. Greenberg, "Statistical Multiplexing and Admission Control Policy for Smoothed Video Streams using e-PCRTT Algorithm", Proceedings of the International Conference on Information Technology: Coding and Computing, pp. 272-277, Mar. 2000.

H.C. Chao, C.L. Hung, Y.C. Chang, and J. L. Chen, "Efficient Changes and Variability Bandwidth Allocation for VBR Media Streams", International Conference on Distributed Computing Systems Workshop, pp. 289-294, Apr. 2001.

U.S. Office Action dated Mar. 6, 2012 cited in U.S. Appl. No. 12/581,020, 13 pgs.

U.S. Office Action dated Jun. 20, 2012 cited in U.S. Appl. No. 12/581,014, 22 pgs.

James D. Salehi et al., "Supporting Stored Video: Reducing Rate Variability and End-to-End Resource Requirements Through Optimal Smoothing," IEEE/ACM Transactions on Networking, vol. 6, No. 4, Aug. 1998, pp. 397-410.

Guohong Cao et al., "Online VBR Video Traffic Smoothing," IEEE, 1999, pgs. 502-507.

\* cited by examiner

VIDEO TRAFFIC BANDWIDTH PREDICTION

RELATED APPLICATIONS

Under provisions of 35 U.S.C. §119(e), Applicants claim the benefit of U.S. Provisional Application No. 61/092,823, filed Aug. 29, 2008, which is hereby incorporated by reference.

BACKGROUND

In video distribution systems, decoding equipment may receive a video stream comprising audio and video data for presenting a corresponding program. The data for each program may be encoded in a format, such as Motion Picture Entertainment Group 2 or 4 (MPEG-2 or MPEG-4), in which intra-coded frames may occur at fixed maximum intervals in the stream, known as the Group Of Pictures (GOP) interval. Other frames, known as B-frames and P-frames, may carry only those portions of an individual video frame that differ from a previous and/or subsequent video frame in order to reduce the size of the data that is transmitted for that frame. In conventional systems, the bandwidth required to transmit these frames may be difficult to predict or estimate, however, leading to inefficient allocations of bandwidth in excess of that required. Furthermore, a shortage of bandwidth can lead to noticeable transmission delays and/or errors in the video data, thus degrading a viewer's experience.

SUMMARY

Consistent with embodiments of the present invention, systems and methods are disclosed for providing video traffic bandwidth prediction. Video traffic bandwidth prediction may be provided. Frames of a video stream may be encoded according to a compression scheme. The encoded frames may be received and, depending on the type of frame, may be used to predict the size of other frames of the stream. The predicted frame sizes may then be used to allocate bandwidth for transmission of the video stream.

Both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Service providers may deliver content to users over a content delivery system. This content may be encoded using a variety of compression schemes in order to reduce the amount of bandwidth required to transmit the content. Network equipment may provision bandwidth for this content to ensure a smooth flow of data and to minimize interruptions or distortions in the content as provided to a user. The network, however, may be responsible for delivering content to a large number of users, each of which may need to have bandwidth allocated to their chosen programming. For example, two neighbors may each request access to different pay-per-view (PPV) and/or video-on-demand (VoD) content. The content provider may have to balance the bandwidth available to the neighbors in order to provide a quality viewing experience. In conventional systems, this may comprise allocating a static amount of bandwidth to each user for the duration of their requested content, but this may not be the optimal use of the available resources. Consistent with embodiments of the invention, the content streams to be provided may be analyzed as they are transmitted, and sizes of upcoming frames of the content may be predicted. Based on these predictions, the network may schedule and/or vary the amount of bandwidth allocated to each content stream. Consequently, each content stream may be allocated more or less bandwidth as it requires, balancing the need to efficiently allocate resources with the need to provide a quality viewing experiences.

Figure 1:
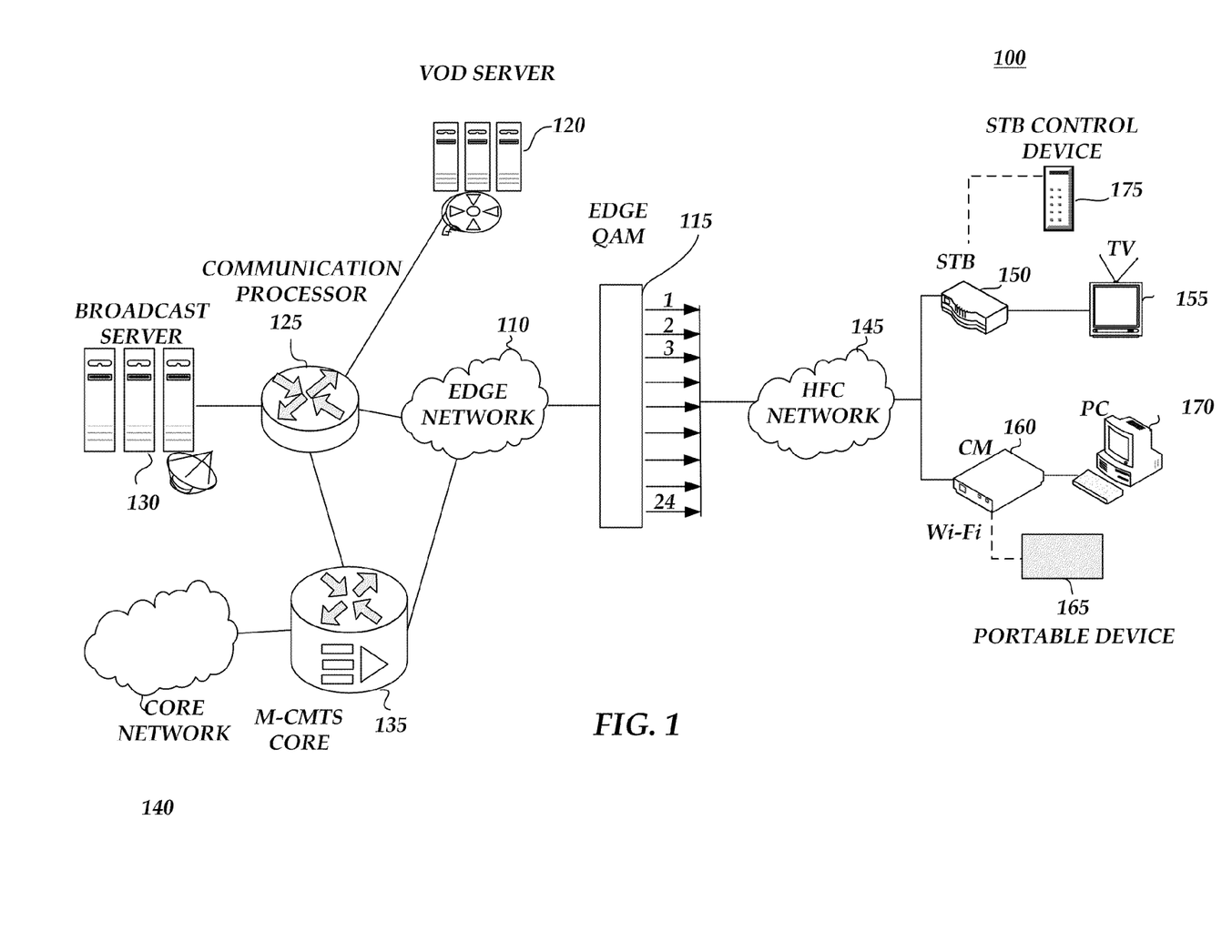
FIG. 1 is a block diagram of a content delivery system.

FIG. 1 is a block diagram of a content delivery system 100. Consistent with embodiments of the present invention, system 100 may comprise an edge network 110, an edge quadrature amplitude modulation (QAM) device 115, a video-on-demand (VOD) server 120, a communication processor 125, a broadcast server 130, a modular cable modem termination system (M-CMTS) core 135, and a core network 140. In addition, system 100 may comprise, a hybrid fiber-coax (HFC) network 145, a set-top-box (STB) 150, a television (TV) 155, a cable modem (CM) 160, a portable device 165, a personal computer (PC) 170, and a STB control device 175. Communications processor 125 will be discussed in greater detail below with respect to FIG. 2.

Edge network 110 may comprise, a network providing, for example, full-duplex, two-way broadband services including broadband video and audio, cable television services, or telecommunications services. Edge network 110 may provide data by utilizing network data formats including, for example, i) Internet protocol (IP); ii) Ethernet; iii) digital subscriber line (DSL); iv) asynchronous transfer mode (ATM); and v) virtual private network (VPN). Edge network 110 may utilize managed network services. Edge network 110 may comprise various components including, for example, i) servers; ii) switches; iii) routers; iv) gateways; v) hubs; vi) fiber optic cable; vii) copper cable; and viii) terminations. The aforementioned are examples and edge network 110 may comprise other configurations for broadband service delivery and data switching over system 100. Consistent with embodiments of the invention, edge network 110 may be operative to allocate and schedule upstream and/or downstream bandwidth for two-way data transmission between video processor 125 and user devices connected to HFC network 145, such as STB 150 and cable modem 160.

Edge QAM 115 may provide modulation for various encoding formats (e.g. for data, audio, and video) and may distribute the signal down multiple broadband channels. Edge QAM 115 may modulate signals in, for example, multi-channel quadrature amplitude modulation. Edge QAM 115 may support broadcast and narrowcast with multi-program transport stream (MPTS) pass-through and single-program transport stream (SPTS) to MPTS multiplexing. Edge QAM 115 may meet data-over-cable service interface specification (DOCSIS) and downstream radio frequency interface (DRFI) performance specifications. Furthermore, edge QAM 115 may provide video over internet protocol and moving pictures expert group (MPEG) video simultaneously. Edge QAM 115 may provide various data switching functions and enable two-way, full-duplex communication within the broadband network. Edge QAM 115 may modulate and distribute broadcast multimedia services including, for example, i) a broadcast multi-media service; ii) a high-definition multimedia service; iii) a digital television multimedia service; iv) an analog multimedia service; v) a VOD service; vi) a streaming video service; vii) a multimedia messaging service; viii) a voice-over-internet protocol service (VoIP); ix) an interactive multimedia service; and x) an e-mail service. The aforementioned are examples and edge QAM 115 may comprise other configurations for different broadband and data services.

VOD server 120 may perform processes for providing video entertainment on demand. VOD server 120 may take MPEG compressed video off a hard disk or a networked service, format it into MPEG-TS packets inside a user datagram protocol (UDP) packet, and send it into edge network 110. Edge QAM 115 may receive the UDP packets, where Internet protocol (IP) encapsulation may be removed. The MPEG packets may be forwarded down one QAM channel on edge QAM 115 and onto HFC network 145.

Edge network 110 and HFC network 145 may comprise non-limiting, example communication networks for the transmission of video streams from a content provider to a user. Other examples may comprise DOCSIS 1.0 and 2.0 networks, digital subscriber line (DSL) networks, wireless networks, and/or any other communication medium.

Broadcast server 130 may perform processes for providing broadcast services. Broadcast server 130 may use a broadcast signal and a narrowcast signal to deliver broadcast services to a broadcast system. Broadcast server 130 may receive video, audio, and data from fiber optic input, wireless input, recorded tape, recorded digital video disc, or satellite input. Broadcast server 130 may utilize digital signal formats and analog signal formats. Furthermore, broadcast server 130 may comprise a specialized receiver and data switching equipment for broadband distribution. In addition, broadcast server 130 may provide broadband multimedia services including, for example, i) the broadcast multi-media service; ii) the high-definition multimedia service; iii) the digital television multimedia service; iv) the analog multimedia service; v) the VOD service; vi) the streaming video service; vii) the multimedia messaging service; viii) the voice-over-internet protocol service (VoIP); ix) the interactive multimedia service; and x) the e-mail service. The aforementioned are examples and broadcast server 130 may comprise other components and systems for providing broadcast services in system 100.

M-CMTS core 135 may receive IP datagrams from core network 140. M-CMTS core 135 may then forward these IP datagrams to either a single QAM channel within edge QAM 115 with traditional DOCSIS encapsulation, or may forward the IP datagrams to multiple QAM channels within edge QAM 115, for example, using DOCSIS bonding. M-CMTS core 135 may support DOCSIS features and end-to-end IP within a next generation network architecture (NGNA), for example.

Core network 140 may comprise any data or broadband network that may provide data and services to edge network 110, communications processor 125, broadcast server 130, or M-CMTS core 135. For example, core network 140 may comprise the Internet. In addition, core network 140 may comprise various components including, for example, i) servers; ii) switches; iii) routers; iv) gateways; v) hubs; vi) fiber optic cable; vii) copper cable; and viii) terminations. The aforementioned are examples and core network 140 may comprise other components and may supply other services using various other formats.

HFC network 145 may comprise a communications network (e.g. a cable TV network) that uses optical fiber, coaxial cable, or an optical fiber coaxial cable combination. Fiber in HFC network 120 may provide a high-speed backbone for broadband services. Coaxial cable may connect end users in HFC network 120 to the backbone. Such networks may use, for example, matching DOCSIS cable modems at a head end and at an end user's premises. Such a configuration may provide bi-directional paths and Internet access.

STB 150 may comprise a single component or a multi-component system for receiving broadband services. STB 150 may comprise a service consumer system combining several components including, for example, a set top box, cable modem 160, a network interface unit, a residential gateway, a terminal unit, a scrambler/descrambler, a digital storage media unit, an input/output port, a display device, a keyboard, and a mouse. STB 150 may encode and decode digital and analog signals, and provide interface capability for other components. STB 150 may utilize various operating systems and other software components. The end user's premises may contain STB 150. STB 150 may include all the functionality provided by a cable modem, such as CM 160, in one component and attach to TV 155, for example.

TV 155 may comprise an end use device for displaying delivered broadband services. TV 155 may comprise, for example, a television, a high definition television (HDTV), a liquid crystal display unit (LCD), a video projection unit, or PC 170. The aforementioned are examples and TV 155 may comprise other display devices for delivered broadband services.

CM 160 may comprise, for example, a cable modem, a network server, a wireless fidelity data switch, or an Ethernet switch. CM 160 may provide data services to the user by accessing DOCSIS services from system 100. CM 160 may provide Internet access, video, or telephone services. The aforementioned are examples and CM 160 may comprise other data delivery devices.

Portable device 165 or PC 170 may comprise any personal computer, network switch, wireless switch, network hub, server, personal digital assistant, and home computing device. Portable device 165 or PC 170 may serve as user devices for data access from system 100. Portable device 165 and PC 170 may transmit and receive data and services from system 100.

STB control device 175 may comprise any input and output device for interfacing with STB 150 or TV 155. For example, STB control device 175 may be a remote control for using STB 150. STB control device 175, after proper programming, may interface with STB 150.

Embodiments consistent with the invention may comprise a system for predicting video traffic bandwidth requirements. The system may comprise a memory storage and a processing unit coupled to the memory storage. The processing unit may be operative to process video data encoded in a compression scheme, such as MPEG-2 and/or MPEG-4. The processing unit may predict the size of subsequent data frames of a content stream and may allocate bandwidth in edge network 110 and/or HFC network 145 accordingly. The processing unit may also be operative to share its predicted sizes and/or bandwidth requirements with components of edge network 110 and/or HFC network 145 operative to control and/or allocate bandwidth resources.

Consistent with embodiments of the present invention, the aforementioned memory, processing unit, and other components may be implemented in a content delivery system, such as system 100 of FIG. 1. Any suitable combination of hardware, software, and/or firmware may be used to implement the memory, processing unit, or other components. By way of example, the memory, processing unit, or other components may be implemented with communications processor 125, in combination with system 100. The aforementioned system and processors are examples and other systems and processors may comprise the aforementioned memory, processing unit, or other components, consistent with embodiments of the present invention.

Figure 2:
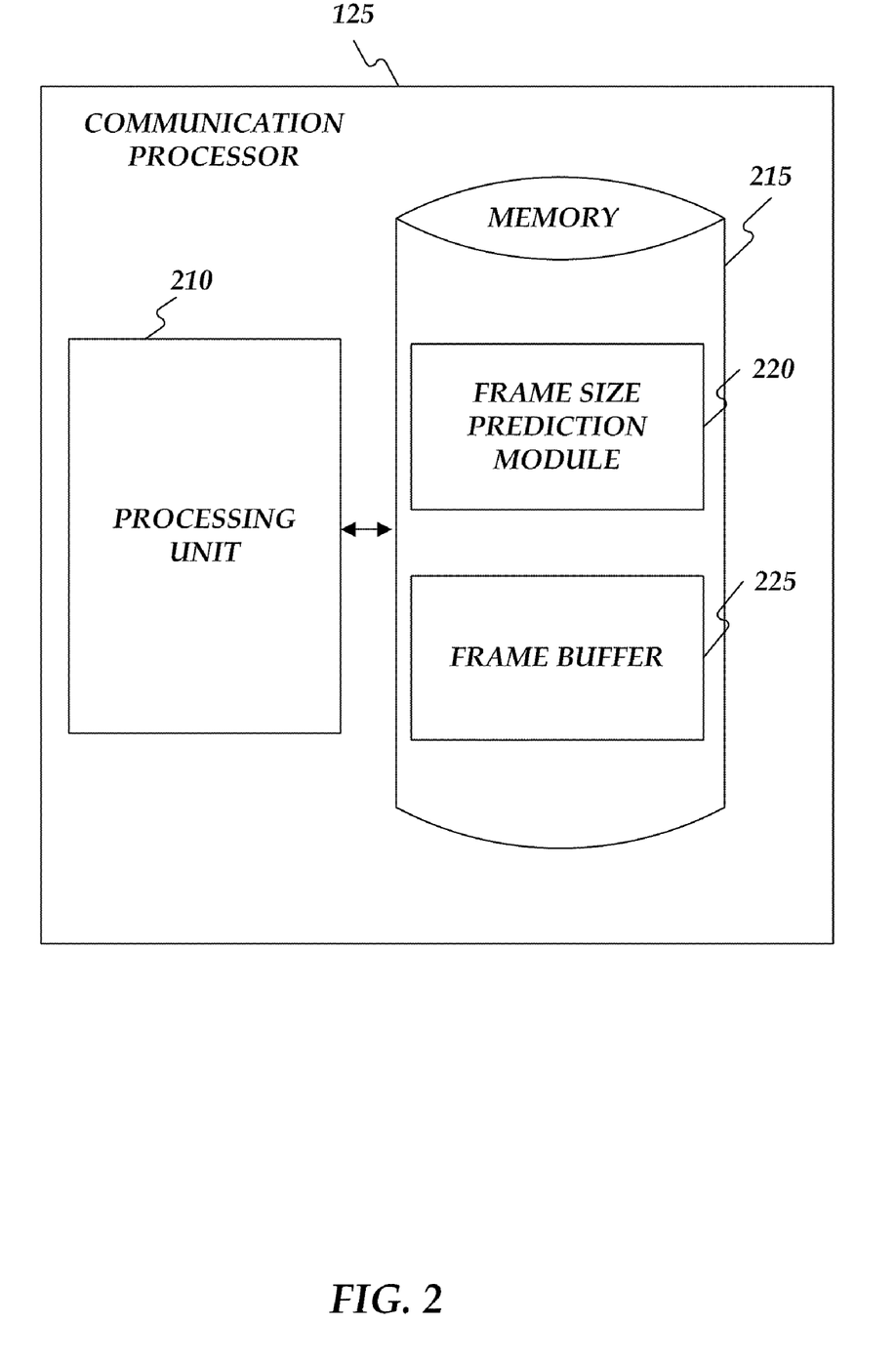
FIG. 2 is a block diagram of a communication processor.

FIG. 2 shows communications processor 125 of FIG. 1 in more detail. As shown in FIG. 2, communications processor 125 may include a processing unit 210 and a memory unit 215. Memory 215 may include a frame size prediction software module 220 and a frame buffer 225. While executing on processing unit 210, frame size prediction software module 220 may perform processes for predicting encoded frame sizes and/or bandwidth requirements, including, for example, one or more stages included in method 300 described below with respect to FIG. 3. Furthermore, frame size prediction software module 220 and frame buffer 225 may be executed on or reside in any element shown and/or described with respect to FIG. 1. Moreover, any one or more of the stages included in method 300 may be performed on any element shown in FIG. 1 including, but not limited to, VoD server 120, broadcast server 130, edge network 110, edge QAM 115, HFC network 145, STB 150, TV 155, CM 160, PC 170, or portable device 165.

Communications processor 125 ("the processor") may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Encoding schemes such as MPEG-2 and MPEG-4 may compress video frame data for transmission over a network. Each picture element of a frame, or pixel, may be represented by one luma number and two chrominance numbers comprising the brightness and color of the pixel. These pixel representations, in HDTV, for example, may comprise a raw video stream of 149,299,200 bytes per second for 24 fps video. The actual transmission size may vary depending on a number of factors such as the frame rate, resolution, and compression scheme. Much of the data from frame to frame may be redundant, however, such as where a scene of a person talking changes little from frame to frame apart from the person's mouth movements.

Figure 3:
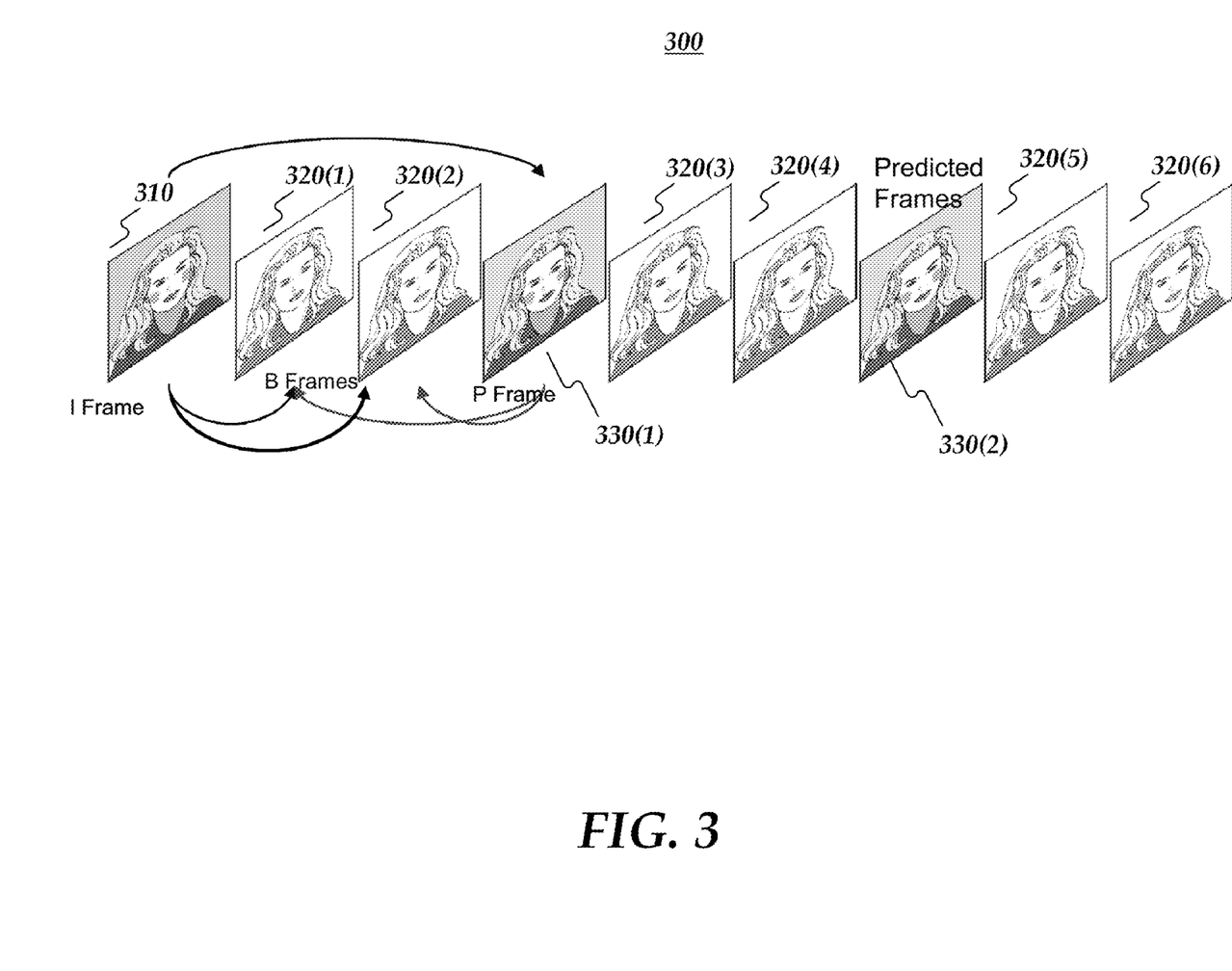
FIG. 3 is an example illustration of a Group of Pictures interval.

FIG. 3 is an example illustration of a Group of Pictures (GOP) interval 300 that may be used in the MPEG encoding schemes to compress the raw video stream. A GOP may comprise a number of frames of video, typically 8, 12, or 16 frames per group. GOP 300 may comprise a partial group for illustration purposes, and may comprise an intra-coded frame (I-frame) 310, a plurality of bidirectionally-predictive-coded frames (B-frames) 320(1)-320(6), and a plurality of predictive-coded frames (P-frames) 330(1)-330(2). I-frame 310 may comprise a compressed version of a single uncompressed (raw) frame. It may take advantage of spatial redundancy and of the inability of the eye to detect certain changes in the image from a previous frame. Unlike P-frames and B-frames, I-frames do not depend on data in the preceding or the following frames. However, because the compression algorithm may exclude pixel data that may be considered redundant from a previous frame, an I-frame may not include data for every pixel of the frame. Thus, the size of I-frames may vary over the course of a video stream. For example, an I-frame representing part of the same visual scene as the immediately previous frame may be much smaller in size than an I-frame representing an entirely new and different frame.

During compression, the raw frame may be divided into 8 pixel by 8 pixel blocks. The data in each block may be transformed by a discrete cosine transform resulting on an 8 by 8 matrix of coefficients. The transform may convert spatial variations into frequency variations, but it does not change the information in the block; the original block may be recreated by applying the inverse cosine transform. The frame image may be simplified by quantizing the coefficients and compressing the matrix. Depending on the encoding scheme, every Nth frame is made into an I-frame. P-frames and B-frames might follow an I-frame like this, IBBPBBPBBPBB (I), to form a Group Of Pictures (GOP). The number of frames per interval is variable, and may change over the course of a video stream and/or vary according to a modulation scheme used to transmit the stream. A default GOP size for NTSC modulation may comprise 15, for example, while PAL modulation may comprise a GOP size of 12. A GOP may also end early in order to encode the first frame of a new scene as an I-frame.

P-frames may provide more compression than I-frames because they take advantage of the data in the previous I-frame or P-frame. I-frames and P-frames may be referred to as reference frames, and consistent with embodiments of the invention, B-frames may also be used as reference frames. To generate a P-frame, the previous reference frame is reconstructed. The frame being compressed may be divided into 16 pixel by 16 pixel macroblocks. Then, for each of those macroblocks, the reconstructed reference frame may be searched to find that 16 by 16 macroblock that best matches the macroblock being compressed. The offset may be encoded as a motion vector. The offset is zero, but, if something in the picture is moving, the offset might be something like 23 pixels to the right and 4 pixels up. If no suitable match is found, the macroblock may be treated like an I-frame macroblock and encoded as a whole. The processing of B-frames is similar to that of P-frames except that B-frames may use the picture in the following reference frame as well as the picture in the preceding reference frame. As a result, B-frames may provide more compression than P-frames.

In an encoded video stream, the B-frames may occupy the most number of frames (and a significant amount of bandwidth) in each GOP. In addition, a trace of the B-frames may be burstier than a trace of the other frame types, so the bandwidth allocation for the B-frames may be more challenging than the other frame types. B-frames may sometimes be dropped to conserve bandwidth resources and reduce bit rate variability. Reducing the bit rate variability may be equivalent to smoothing the encoded video bit stream. In some instances, all and/or a large number of the B-frames in the entire video may be removed without compromising the quality of video playback. Thus, the ability to predict the size of the B-frames may allow a cable headend to provision bandwidth efficiently or reduce set top box buffer requirements and packet losses under periods of peak network utilization. This may be accomplished by predicting insignificant B-frames that may be safely discarded without degrading the video stream display quality.

Figure 4:
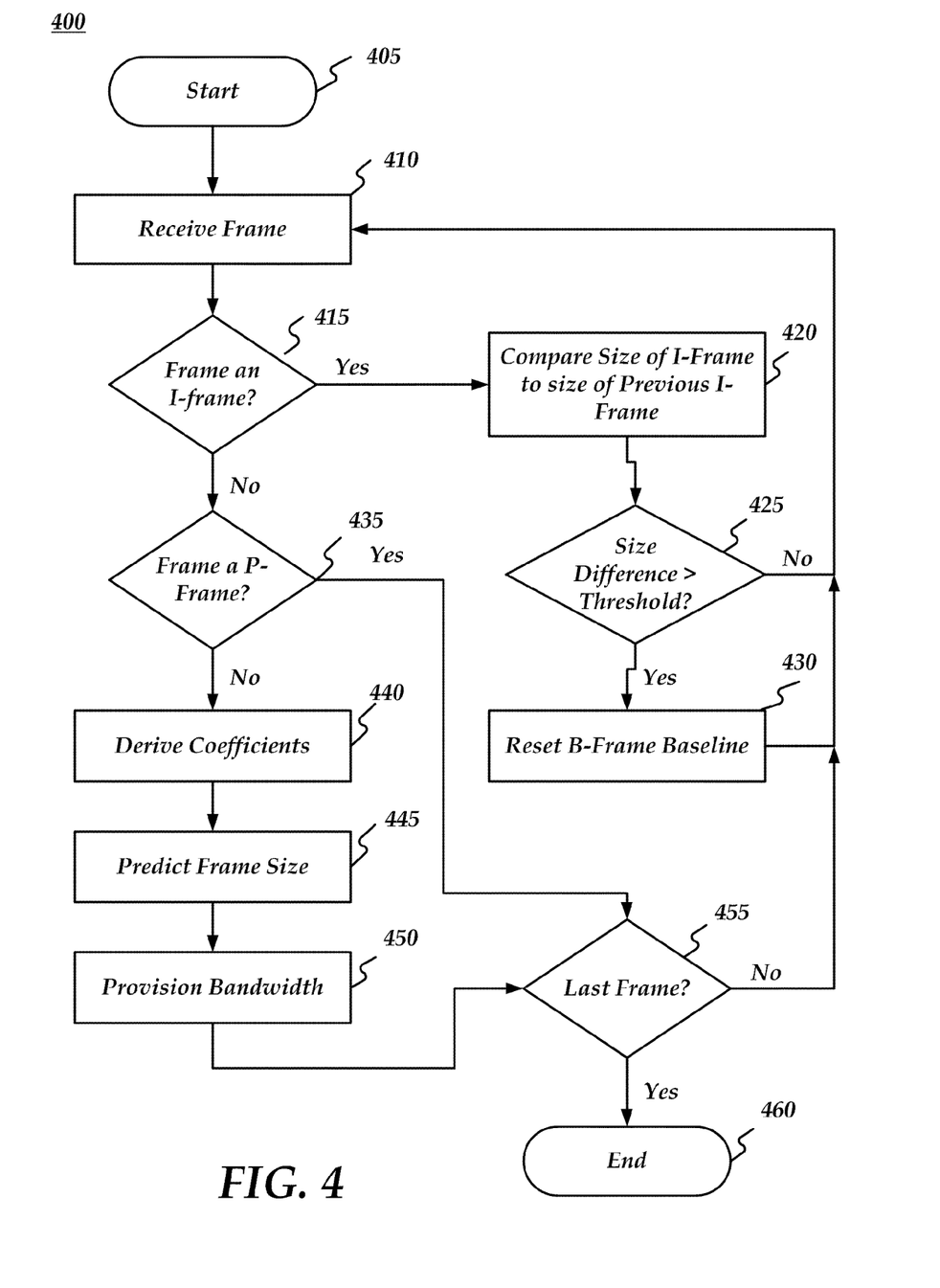
FIG. 4 is a flow chart of a method for predicting bandwidth requirements.

FIG. 4 is a flow chart of a method 400 for predicting video frame sizes. Method 400 may by implemented using communication processor 125 as described above with respect to FIGS. 1 and 2. Ways to implement the stages of method 400 will be described in greater detail below. Method 400 may begin at starting block 405 and proceed to stage 410 where communication processor 125 may receive an encoded video frame. For example, video frames encoded using the MPEG-1, MPEG-2, and/or MPEG-4 compression schemes may be received. The video frames may comprise a plurality of frame types, such as I-frames, B-frames, and P-frames. The size of the first B-frame received may be measured and used as a baseline for predicting the size of subsequent B-frames. Similarly, the sizes of I-frames and P-frames may be measured and stored for future references. Frames may be buffered as they are received prior to transmission to another destination, such as a subscriber's residential equipment.

From stage 410, method 400 may advance to stage 415 where communication processor 125 may determine whether the video frame comprises an I-frame. If the frame is determined to comprise an I-frame, method 400 may advance to stage 420, where communication processor 125 may determine whether the I-frame comprises a scene change. For example, communication processor 125 may measure the size of the I-frame and calculate a difference in size between it and a previous I-frame.

From stage 420, method 400 may advance to stage 425 where communication processor 125 may determine whether the size difference between the two I-frames exceeds a threshold value. If, at stage 425, communication processor 125 determines that the size difference does exceed the threshold value, method 400 may advance to stage 430, where communication processor 125 may reset the B-frame baseline. That is, the next B-frame to be received may be measured for size rather than predicted. This may help reduce errors in size prediction when scene changes in the video stream occur. Once the B-frame baseline is reset in stage 430, or if no scene change is detected at stage 425, method 400 may return to stage 410 and receive the next frame in the stream.

If, at stage 415, communication processor 125 determines that the frame is not an I-frame, method 400 may advance to stage 435 where communication processor 125 may determine whether the received frame comprises a P-frame. If the received frame is determined to comprise a P-frame, method 400 may advance to stage 455 where communication processor 125 may determine whether the frame is the last frame of the stream. If the frame comprises the last stream, method 400 may end at stage 460. Otherwise, method 400 may return to stage 410 and receive the next frame.

If the frame is not determined to be a P-frame in stage 435, method 400 may advance to stage 440, where communication processor 125 may derive at least one coefficient for predicting the size of the frame, which may comprise a B-frame. For example, a least squared method may be employed to derive the coefficient(s) for predicting the size of each B-frame in a GOP interval. Consistent with embodiments of the invention, the least squared derivation method may be implemented in a computer simulation program such as Matlab®, produced and sold by The Mathworks™ of Natick, Mass. The implementation code may comprise, for example, the code illustrated below in Table 1.

TABLE 1

Example Matlab ® Code

```
function lq = leastSquare(trace, order)
%
% Syntax: leastSquare(TRACE, ORDER)
% Calculates "order" least Square coefficients % %
lq = zeros(order, 1);
sizeTrace = length(trace);
a = zeros(sizeTrace, order);
for i=order+1:sizeTrace
    for j=1:order
        a(i,j) = trace (i-j);
    end;
end;
for i=order:-1:2
    for j=1:i-1
        a(i,j) = trace(i-j);
    end;
end;
mat = inv(a'*a)*a';        % a' is the transpose of matrix a
b = zeros(sizeTrace, 1);
for i=1:sizeTrace
    b(i,1) = trace(i);
end;
lq = mat*b;
```

The least squared method may be used to derive the correlation coefficients $\alpha_j$ and $\gamma_j$ with j ranging, for example, from 1 to 8. The least square method may be used to compute the best curve of an input video trace. As an example, performing the simulation on the movie "Silence of the Lambs," encoded using MPEG-4 results in the coefficients listed in Table 2. The pattern of the GOP in this example comprises a 12-frame GOP—$IB_1B_2P_1B_3B_4P_2B_5B_6P_3B_7B_8$.

TABLE 2

Example Coefficients

| | B-1 | B-2 | B-3 | B-4 | B-5 | B-6 | B-7 | B-8 |
|---|---|---|---|---|---|---|---|---|
| α | 0.6053 | 0.7972 | 0.7433 | 0.8030 | 0.6935 | 0.7033 | 0.7954 | 0.9337 |
| γ | 0.3104 | 0.1586 | 0.1876 | 0.1521 | 0.2317 | 0.2312 | 0.1432 | 0.0503 |

From stage 440, where communication processor 125 derived the coefficients from a trace size, method 400 may advance to stage 445 where communication processor 125 may predict the size of the received frame according to the following equations. In these equations $B_{1,t}$ may comprise the size of the $t^{th}$ B-1 frame (i.e., the size of the first B-frame of the $t^{th}$ GOP of the encoded video). In the same way, the vectors $B_2$, $B_3$, $B_4$, $B_5$, $B_6$, $B_7$, $B_8$, $P_1$, $P_2$, and $P_3$ may correspond to the frames of the trace. All these vectors may have the same length (L), which is the number of GOPs in the encoded video. The vector B is the trace of all the B-frames. $B_t=[B_{1,t}, B_{2,t}, B_{3,t}, B_{4,t}, B_{5,t}, B_{6,t}, B_{7,t}, B_{8,t}]$. The length of B is 8L. A linear model may be employed for all t between 2 and L as described in Equation 1. Thus, the size of a previous B-frame and the size of a sequentially closest P-frame, either prior or subsequent to the received B-frame, may be used in predicting the size of the received B-frame. The predicted size of the B-frame may then be used to provision the bandwidth for the next B-frame.

$$\hat{B}_{1,t} = \alpha_1 B_{8,t-1} + \gamma_1 P_{1,t}$$

$$\hat{B}_{2,t} = \alpha_2 B_{1,t} + \gamma_2 P_{1,t}$$

$$\hat{B}_{3,t} = \alpha_3 B_{2,t} + \gamma_3 P_{1,t}$$

$$\hat{B}_{4,t} = \alpha_4 B_{3,t} + \gamma_4 P_{2,t}$$

$$\hat{B}_{5,t} = \alpha_5 B_{4,t} + \gamma_5 P_{2,t}$$

$$\hat{B}_{6,t} = \alpha_6 B_{5,t} + \gamma_6 P_{3,t}$$

$$\hat{B}_{7,t} = \alpha_7 B_{6,t} + \gamma_7 P_{3,t}$$

$$\hat{B}_{8,t} = \alpha_8 B_{7,t} + \gamma_8 P_{3,t} \qquad \text{Equation 1}$$

Consistent with embodiments of the invention, the size of the B-frame may be predicted using similar equations regardless of the size of the GOP. For example, a GOP of 16 frames (I $B_1 B_2 B_3$ $P_1$ $B_4 B_5 B_6$ $P_2$ $B_7 B_8 B_9$ $P_3$ $B_{10} B_{11} B_{12}$) may use Equation 2 to predict the size of each B-frame.

$$\hat{B}_{1,t} = \alpha_1 B_{12,t-1} + \gamma_1 P_{1,t}$$

$$\hat{B}_{2,t} = \alpha_2 B_{1,t} + \gamma_2 P_{1,t}$$

$$\hat{B}_{3,t} = \alpha_3 B_{2,t} + \gamma_3 P_{1,t}$$

$$\hat{B}_{4,t} = \alpha_4 B_{3,t} + \gamma_4 P_{1,t}$$

$$\hat{B}_{5,t} = \alpha_5 B_{4,t} + \gamma_5 P_{1,t}$$

$$\hat{B}_{6,t} = \alpha_6 B_{5,t} + \gamma_6 P_{2,t}$$

$$\hat{B}_{7,t} = \alpha_7 B_{6,t} + \gamma_7 P_{2,t}$$

$$\hat{B}_{8,t} = \alpha_8 B_{7,t} + \gamma_8 P_{2,t}$$

$$\hat{B}_{9,t} = \alpha_9 B_{8,t} + \gamma_9 P_{3,t}$$

$$\hat{B}_{10,t} = \alpha_{10} B_{9,t} + \gamma_{10} P_{3,t}$$

$$\hat{B}_{11,t} = \alpha_{11} B_{10,t} + \gamma_{11} P_{3,t}$$

$$\hat{B}_{12,t} = \alpha_{12} B_{11,t} + \gamma_{12} P_{3,t} \qquad \text{Equation 2}$$

A variant model for the prediction of the size of the B-frames may alter the vector calculation for B-frames described by Equation 1. For example, instead of basing the predicted size upon the closest P-frame regardless of whether the P-frame is prior or subsequent to the frame in question, the calculation may use the closest subsequent P-frame. That is, Equation 1 may use variants for the prediction of the B-3 and B-5 frames as described in Equation 3.

$$\hat{B}_{3,t} = \alpha_3 B_{2,t} + \gamma_3 P_{2,t}$$

$$\hat{B}_{5,t} = \alpha_5 B_{4,t} + \gamma_5 P_{3,t} \qquad \text{Equation 3}$$

The least squared method described with respect to stage 440 above may provide 16 coefficients corresponding to the 8 different B-frames. Consistent with embodiments of the invention, the number of coefficients may be reduced to only one $\alpha$ and one $\gamma$ to describe all B-frames. The constant $\alpha$ may replace each $\alpha_j$ and the constant $\gamma$ may replace each $\gamma_j$ in Equations 1-3. The values $\alpha$ and $\gamma$ may be determined using the values of $\alpha_j$ and $\gamma_j$ determined previously, and may comprise an arithmetic average of the set of $\alpha_j$ and $\gamma_j$ values, respectively. Further consistent with embodiments of the invention, the values of $\alpha_j$ and $\gamma_j$ may be balanced by the inverse of the error they introduce into the model according to Equation 4.

$$\alpha = \sum_{i=1}^{8} \alpha_i * \frac{\lambda_i}{\sum \lambda_i}$$

$$\gamma = \sum_{i=1}^{8} \gamma_i * \frac{\lambda_i}{\sum \lambda_i}$$

$$\lambda_i = \frac{1}{\varepsilon_i} \qquad \text{Equation 4}$$

After predicting the size of the B-frame in stage 445, method 400 may advance to stage 450 where communication processor 125 may provision bandwidth for transmitting the B-frame according to the predicted size. For example, communication processor 125 may be in communication with a router and/or other network device operative to direct traffic from a cable headend to various subscriber terminals. A fixed amount of bandwidth may be available over edge network 110 and/or HFC network 145 for transmitting video streams to subscriber devices such as STB 150 and/or cable modem 160. Communication processor 125 may thus reserve only as much bandwidth as is needed for transmitting the B-frame during the time slot that the B-frame is to be transmitted.

From stage 450, method 400 may advance to stage 455 where communication processor 125 may determine whether the frame comprises the last frame of the video stream. If not, method 400 may return to stage 410 where communication processor 125 may receive the next frame. Otherwise, method 400 may end at stage 460.

Figure 5A:
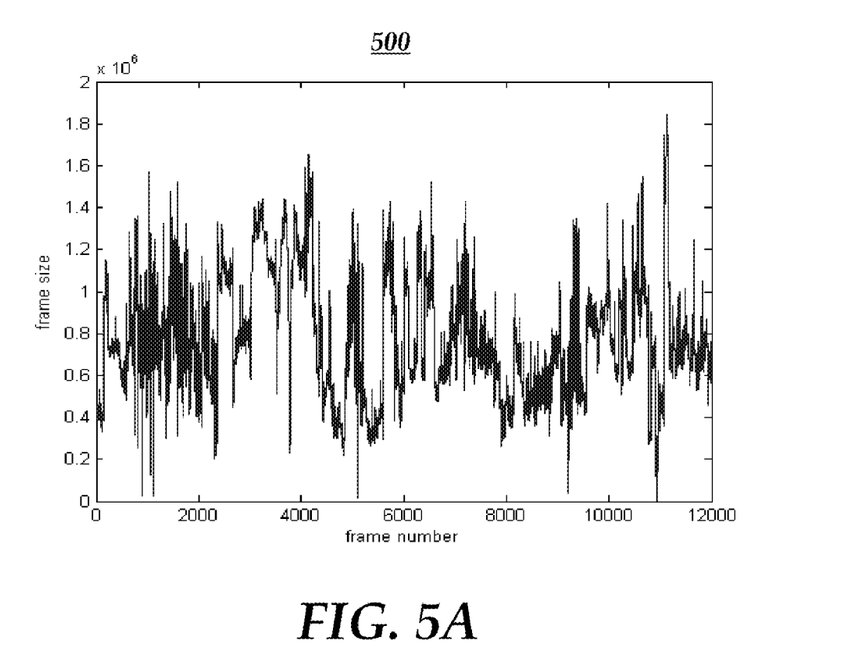
FIGS. 5A-5B are plots depicting traces of a video data signal.
Figure 5B:
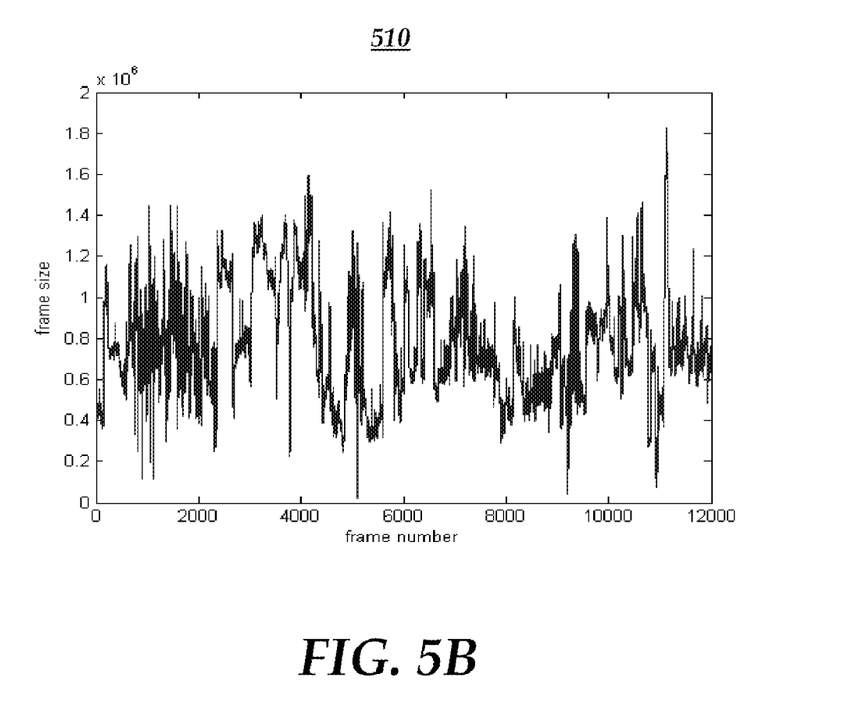

After deriving the correlation coefficients at stage 440, Equation 1 and/or Equation 2, for example, may be used to build a predicted vector of B-frames. FIGS. 5A-5B comprise an original trace plot 500 and a predicted trace plot 510 of B-frames for an example video stream. The similarity of predicted trace plot 510 to original trace plot 500 demonstrates that the linear model described above fits the real trace.

Figure 6:
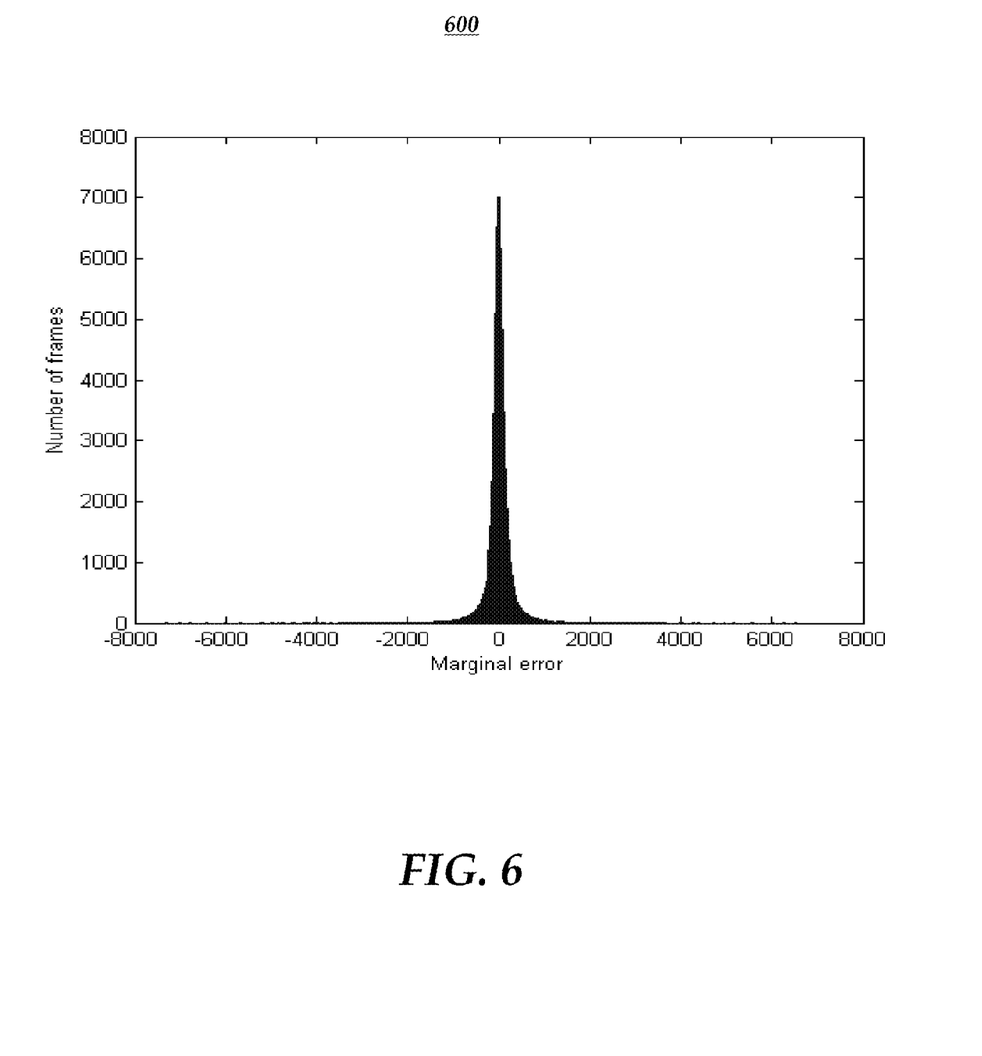
FIG. 6 is a histogram illustrating a marginal error of the predicted trace.

The accuracy of the model may be determined by computing an introduced error ($\varepsilon$) using Equation 5 and comprising a difference between the predicted size of the frame and its actual size. FIG. 6 comprises a histogram 600 of the marginal error associated with a comparison of predicted trace plot 510 and original trace plot 500.

$$\varepsilon_m = \hat{X}_m - X_m \qquad \text{Equation 5}$$

The size of a GOP, defined as the sum of the sizes of all frames in the GOP, may also be predicted. As with B-frame size prediction, the video trace may be analyzed to determine correlation statistics of frame and GOP size. Typically, the biggest frame in each GOP is the first frame, an I-frame type, and a strong correlation may exist between the size of the I-frame and the size of the GOP. Thus, a linear prediction of the GOP size using two previous GOPs as described below in Equation 6 and using the current I-frame and the previous GOP as described in Equation 7 may present similar accuracy. In Equations 6 and 7, $G_t$ may comprise a size of a $t^{th}$ GOP, $I_t$ may comprise a size of the $t^{th}$ I-frame, and the coefficients $\alpha$ and $\beta$ may be computed using a least squared method for all GOPs over the entire video stream. Consistent with embodiments of the invention, GOP size prediction may be used to allocate bandwidth in the longer term than allocating the bandwidth for the next B-frame.

$$\hat{G}_t = \alpha * G_{t-1} + \beta * G_{t-2} \quad \text{Equation 6}$$

$$\hat{G}_t = \alpha * G_{t-1} + \beta * I_{t-1} \quad \text{Equation 7}$$

In order to derive the coefficients $\alpha$ and $\beta$, the least square method may be employed for all frames. However, during a video stream, there may be scene changes that may result in a significant change in the size of the frames and may impair the accuracy of the prediction method. In order to deal with scene changes, a metric may be used to detect when the scene change occurs. Upon such a scene change, the algorithm to predict the size of the next frame may be changed by resetting a baseline frame size and treating the next frames like a new movie. That is, the trace of the video stream may be partitioned according to the scene changes so that the first B-frame of each scene change may be treated like the first B-frame of the video stream.

Each time an encoder, such as a video encoding component of communication processor 125, receives an I-frame it may compute the difference in size with the previous I-frame it has received. If the difference is bigger than a pre-defined threshold, the prediction algorithm may start over. Each scene change typically occurs at the beginning of a GOP and the I-frames are computed without using any reference frame. As a consequence, the size of an I-frame reflects most of the scene changes.

If the threshold is too high, the impact of this method may not be significant because the encoder may detect only a few scene changes. If the threshold is too low, the algorithm may have to start over very often, and this may degrade the transmission of the video in a real-time fashion. Therefore, the choice of the threshold may comprise a tradeoff between the efficiency of the algorithm and real-time transmission. Although a lower threshold enables the detection of gradual scene changes in addition to abrupt changes, this may not be necessary as the linear prediction algorithm may cope better with gradual scene changes than abrupt changes.

Further consistent with embodiments of the invention, the predictive algorithm may be extended further to provide accurate long-term bandwidth usage forecasting. For example, a video headend may forecast bandwidth usage to help minimize packet losses during periods of peak bandwidth demands and to allow pre-fetching of video data. This long-term prediction may comprise estimating Hurst parameter values, which may be used to investigate long-range dependency or self-similarity of the video stream. A Hurst parameter may comprise an index value between 0 and 1 that may determine whether subsequent frames comprise a positive or negative correlation.

M MPEG video frames may be used to predict the size of a video frame generated $\delta$ frames later. This group of M frames may be separated from the single frame to be predicted by $\delta$ frames. M determines the complexity of the model—a bigger M may result in a more complex model, but, if M is too small, the accuracy of the prediction may be compromised. If $\delta$ is small, the prediction may correspond to short-term prediction while a bigger $\delta$ leads to long-term prediction. However, even if the Hurst parameter shows strong long-range dependency, the correlation between the frames may decrease when the $\delta$ increases. A reasonable value $\delta$ may comprise, for example, less than 1200 frames.

The prediction may be made according to a linear prediction model described in Equation 8, below. In Equation 8, $\hat{x}(t+\delta)$ may correspond to the predicted video frame. $x(t-M)$ to $x(t-1)$ may correspond to the video frames used in the prediction. The inequalities may be combined as $1+M<t<L-\delta$. As an example, for a G12/B2 GOP structure of IBBPBBPBBPBB, the variable L may correspond to the number of GOPs of the video while predicting the size of an I-frame or a GOP. Similarly, L may comprise three times the number of GOPs if we predict the size of the P-frames and 8 times the number of GOPs for the B-frames. If $\delta=1$ and $M=2$, Equation 8 may be used to provide short-term prediction as described above.

$$\hat{x}(t+\delta) = \sum_{i=1}^{M} g(i) x(t+i-M-1) \quad \text{Equation 8}$$

The error $E_{\delta,M}$ may be derived according to Equation 9 and used to determine the coefficients $g(i)$. In order to minimize $E_{\delta,M}$, its derivative may be set to zero. The coefficients may then be determined by Equation 10. Once the coefficients are determined, Equation 8 may be used to construct the predicted vector.

$$E_{\delta,M} = \sum_{t=1+M}^{L-\delta} \varepsilon_{\delta,M}^2 (t+\delta) \quad \text{Equation 9}$$

$$\varepsilon_{\delta,M}(t+\delta) = x(t+\delta) - \hat{x}(t+\delta)$$

$$[g(1) \; g(2) \; \ldots \; g(M)]^T = R_{xx}^{-1} R_x$$

where $$\forall i, j = 1, \ldots, M: \quad \text{Equation 10}$$

$$\begin{cases} R_{xx}(i,j) = \sum_{t=j}^{L-\delta+j-M-1} x(t)x(t-i-M-\delta-1) \\ R_x(i) = \sum_{t=1+M+\delta}^{L} x(t)x(t+i-M-\delta-1) \end{cases}$$

The parameter M may be varied, such as by implementing the algorithm with values of M=1, 3, 10, 50. Smaller values of M may reduce the complexity of the algorithm while larger values may achieve better accuracy. Similarly, variances in the parameter $\delta$ may increase or reduce errors in the predictions. For the I-frame and GOP size prediction, for example, the errors may increase with $\delta$ but decrease when $\delta$ is above 200 frames. For the P-frames, the error may be relatively constant when $\delta$ is above 200 frames. For the B-frames, the error may increase when $\delta$ increases. The B-frames differ from the other frames and the GOP in two ways. First, there are usually more B-frames than the other frame types and secondly, the B-frames contain only temporal information (e.g., motion information), which are more prone to changes in a video stream than spatial information.

Long term prediction may be accomplished much as described above with respect to method 400. For example, a video stream trace may be received and each frame may be processed according to its type (e.g., I-frame, P-frame, B-frame). For each frame type, the R matrix and g coefficients described in Equation 10 may be computed. From these values, a predicted trace may be computed. The error between the original video trace and the predicted video trace may then be calculated and/or plotted by reconstructing the predicted trace from the predicted I, P, and/or B frame sizes according to the GOP structure on the encoded stream.

An embodiment consistent with the invention may comprise a system for predicting video frame sizes. The system may comprise a memory storage and a processing unit coupled to the memory storage. The processing unit may be operative to encode video frames according to a compression scheme, such as MPEG-1, MPEG-2, and MPEG-4, and predict a size of at least one of the frames according to a size of at least one previous frame. The predicted size may be based on the size, either actual and/or predicted, of two other encoded frames, such as an immediately previous B-frame and a sequentially close, either preceding or following, P-frame. The system may be further operative to allocate and/or provision bandwidth for the transmission of the video stream.

Another embodiment consistent with the invention may comprise a system for predicting video frame sizes. The system may comprise a communication processor comprising a memory storage coupled to a processing unit, wherein the processing unit is operative to receive a stream of encoded video frames and predict a size of at least one video frame according to a size of at least two other video frames. The system may further comprise a network component operative to provision bandwidth for transmission of the encoded video frames and adjust the provisioned bandwidth for transmission of the encoded video frames according to the predicted size of the at least one video frame. Being operative to predict the video frame size may comprise being operative to derive a common coefficient factor for each of a plurality of B-frames in a group of pictures (GOP) interval and to derive a common coefficient factor for each of a plurality of P-frames in the GOP interval.

Yet another embodiment consistent with the invention may comprise a system for predicting video frame sizes. The system may comprise a memory storage and a processing unit coupled to the memory storage. The processing unit may be operative to receive a video frame encoded according to a compression scheme, determine whether the video frame comprises a B-frame, in response to determining that the video frame comprises a B-frame, predict a size of the video frame according to at least one other video frame, and allocate bandwidth for a transmission of the video frame according to the predicted size. The system may be further operative to determine whether a video frame comprises an I-frame, and, if so, whether the I-frame comprises a scene change in the video stream.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for predicting video frame sizes, the method comprising:
encoding a plurality of video frames according to a compression scheme; and
predicting a size of at least one of the plurality of encoded video frames according to a size of at least one prior encoded video frame wherein predicting the size of the at least one of the plurality of encoded video frames comprises calculating a size of at least one first B-frame by adding a product of a first coefficient multiplied by a size of a sequentially previous B-frame with a product of a second coefficient multiplied by a size of a sequentially closest P-frame.

2. The method of claim 1, further comprising deriving at least one coefficient by a least squared method.

3. The method of claim 1, wherein encoding the plurality of video frames comprises encoding the plurality of video frames as a plurality of frame types, wherein at least one of the plurality of frame types is a predictive frame type.

4. The method of claim 3, wherein encoding the plurality of video frames according to the compression scheme comprises encoding the plurality of video frames according to the compression scheme wherein the compression scheme comprises a dependency of the least one of the plurality of encoded video frame on the at least one prior encoded video frame.

5. The method of claim 1, further comprising buffering the plurality of encoded video frames prior to predicting the size of the at least one of the plurality of encoded video frames.

6. The method of claim 1, further comprising allocating bandwidth for transmission of the plurality of encoded video frames according to the predicted size of the at least one of the plurality of encoded video frames.

7. A system for predicting video frame sizes, the system comprising:
a memory storage; and
a processing unit coupled to the memory storage, wherein the processing unit is operative to:
encode a plurality of video frames according to a compression scheme; and
predict a size of at least one of the plurality of encoded video frames according to a size of at least one prior encoded video frame wherein the processing unit being operative to predict the size of the at least one of the plurality of encoded video frames comprises the processing unit being operative to calculate a size of at least one first B-frame by adding a product of a first coefficient multiplied by a size of a sequentially previous B-frame with a product of a second coefficient multiplied by a size of a sequentially closest P-frame.

8. The system of claim 7, further comprising the processing unit being operative to derive at least one coefficient by a least squared method.

9. The system of claim 7, wherein the processing unit being operative to encode the plurality of video frames comprises the processing unit being operative to encode the plurality of video frames as a plurality of frame types, wherein at least one of the plurality of frame types is a predictive frame type.

10. The system of claim 9, wherein the compression scheme comprises a dependency of the least one of the plurality of encoded video frame on the at least one prior encoded video frame.

11. The system of claim 7, further comprising the processing unit being operative to buffer the plurality of encoded video frames prior to predicting the size of the at least one of the plurality of encoded video frames.

12. The system of claim 7, further comprising the processing unit being operative to allocate bandwidth for transmission of the plurality of encoded video frames according to the predicted size of the at least one of the plurality of encoded video frames.

13. A non-transitory computer-readable storage medium device that stores a set of instructions which when executed perform a method for predicting video frame sizes, the method executed by the set of instructions comprising:
encoding a plurality of video frames according to a compression scheme; and predicting a size of at least one of the plurality of encoded video frames according to a size of at least one prior encoded video frame wherein predicting the size of the at least one of the plurality of encoded video frames comprises calculating a size of at least one first B-frame by adding a product of a first coefficient multiplied by a size of a sequentially previous B-frame with a product of a second coefficient multiplied by a size of a sequentially closest P-frame.

14. The computer-readable storage medium device of claim 13, further comprising deriving at least one coefficient by a least squared method.

15. The computer-readable storage medium device of claim 13, wherein encoding the plurality of video frames comprises encoding the plurality of video frames as a plurality of frame types, wherein at least one of the plurality of frame types is a predictive frame type.

16. The computer-readable storage medium device of claim 15, wherein encoding the plurality of video frames according to the compression scheme comprises encoding the plurality of video frames according to the compression scheme wherein the compression scheme comprises a dependency of the least one of the plurality of encoded video frame on the at least one prior encoded video frame.

17. The computer-readable storage medium device of claim 13, further comprising buffering the plurality of encoded video frames prior to predicting the size of the at least one of the plurality of encoded video frames.

18. The computer-readable storage medium device of claim 13, further comprising allocating bandwidth for transmission of the plurality of encoded video frames according to the predicted size of the at least one of the plurality of encoded video frames.

* * * * *

UNITED STATES PATENT AND TRADEMARK OFFICE
CERTIFICATE OF CORRECTION

PATENT NO. : 8,254,449 B2  
APPLICATION NO. : 12/550698  
DATED : August 28, 2012  
INVENTOR(S) : Benny Bing et al.

Page 1 of 1

It is certified that error appears in the above-identified patent and that said Letters Patent is hereby corrected as shown below:

IN THE CLAIMS:

Column 16, line 19, claim 10, "frame" should read --frames--; and

Column 16, line 55, claim 16, "frame" should read --frames--.

Signed and Sealed this
Sixteenth Day of June, 2015

Michelle K. Lee
*Director of the United States Patent and Trademark Office*